(No Model.)

N. C. MADSEN & H. J. NIELSEN.
APPARATUS FOR SOURING CREAM.

No. 279,876. Patented June 19, 1883.

Witnesses:

Inventors.
Niels Chrestian Madsen
Hans Joseph Nielsen
By Louis Bagger & Co,
Attorneys.

UNITED STATES PATENT OFFICE.

NIELS C. MADSEN AND HANS J. NIELSEN, OF COPENHAGEN, DENMARK.

APPARATUS FOR SOURING CREAM.

SPECIFICATION forming part of Letters Patent No. 279,876, dated June 19, 1883.

Application filed March 31, 1883. (No model.)

*To all whom it may concern:*

Be it known that we, NIELS CHRESTIAN MADSEN and HANS JOSEPH NIELSEN, both subjects of the King of Denmark, residing at the city of Copenhagen, in the Kingdom of Denmark, have invented certain new and useful Improvements in Apparatus for Souring Cream; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
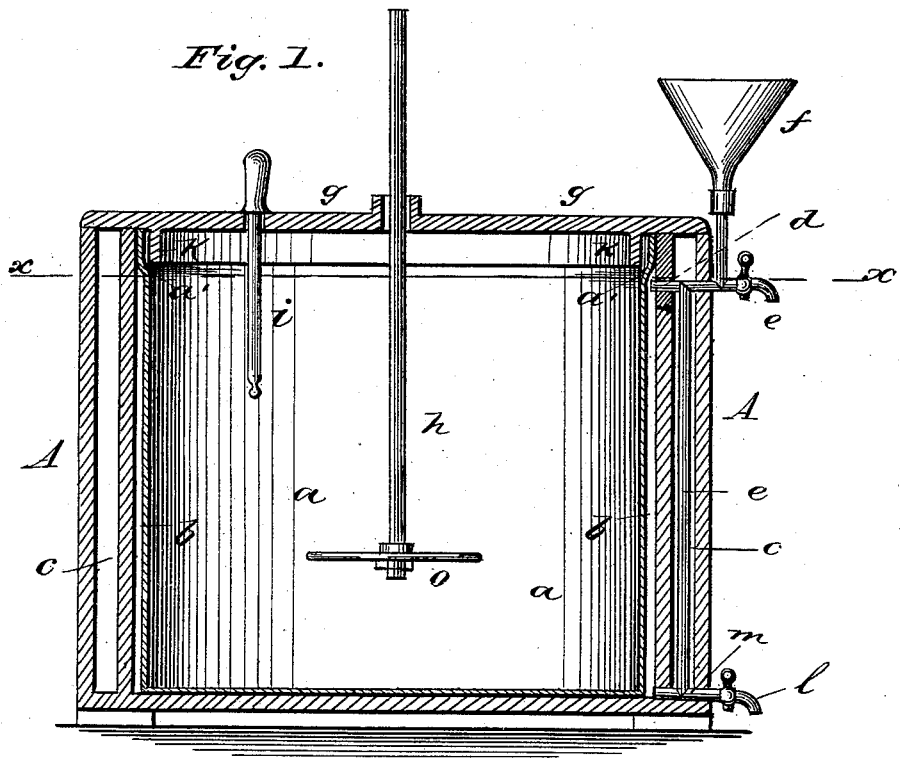
Figure 2:
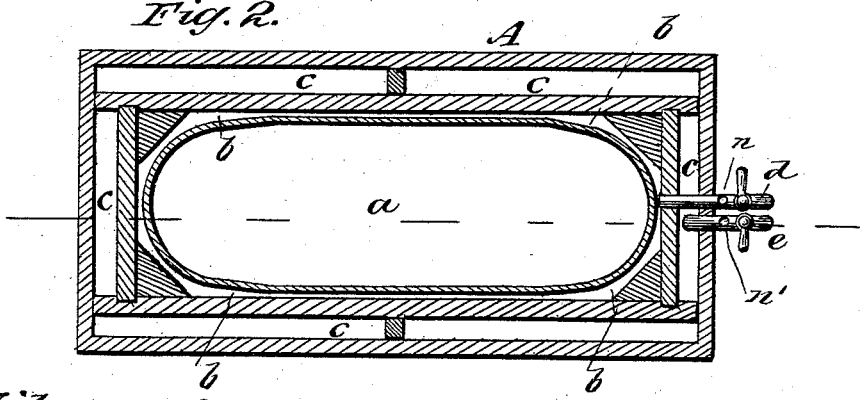

Figure 1 is a longitudinal vertical section of our improved apparatus; and Fig. 2 is a horizontal section of the same through the line $x\,x$ in Fig. 1.

Similar letters of reference indicate corresponding parts in both the figures.

Our invention has relation to apparatus for souring cream before the same is churned to make butter. The advantages of subjecting the cream to a souring process before it is churned are well understood; and our invention contemplates the construction of an apparatus which, while inexpensive, so that it may be manufactured at a small cost, can be readily manipulated by any dairy-maid or other attendant in a dairy.

In the accompanying drawings, $a$ represents a box or case, made of tin or sheet metal, which is inserted into an outer case, A, having double walls, forming a space, $c$, which is packed with any suitable material that is a poor conductor of heat, such as rice-husks, sawdust, or anything else that will answer the purpose. A narrow space (shown at $b$) is left between the walls of the inside case, $a$, and the inner wall of the inclosing-box, which latter is provided with a tightly-fitting cover, $g$, having a flange, $k$, which fits inside of the shouldered upper part, $a'$, of the box $a$. A pipe, $d$, is inserted through the outside case, A, and opens up into the top part of the narrow space $b$, as shown in Fig. 1 of the drawings. Another pipe, $e$, is inserted through the outer wall of casing A, and is continued down through the space $c$ to the bottom of the case, where it has a T-head, $m$, the inner end of which opens up into and at the bottom of space $b$, while its outer arm extends through the outer wall of casing A, and is provided with a faucet, $l$. Both the pipes $d$ and $e$ have faucets or outlets at their upper ends, and are provided with openings $n\,n'$ for the insertion of the funnel $f$. When the funnel is not in use, these openings $n\,n'$ should be closed by suitable plugs or screw-caps. Through the middle part of the cover $g$ is inserted the staff $h$ of the agitator $o$, and through another aperture in cover $g$ is inserted a removable thermometer, $i$, by means of which the temperature of the cream contained in the inside box, $a$, may readily be ascertained.

The operation of the apparatus is as follows: If it is desired to raise the temperature of the cream for the purpose of souring it, the space $b$ is filled with hot water, by means of the funnel $f$, through pipe $d$. As the water gradually cools off and sinks to the bottom of the space or chamber $b$ it rises through the other pipe, $e$, and escapes through the faucet at the upper end of the same, which is left open for that purpose. If, on the other hand, it is desired to reduce the temperature of the cream for the purpose of expediting the souring process, the chamber $b$ is filled with cold water through the other pipe, $e$, by inserting the funnel $f$ into the aperture or feed-hole $n'$ of the same, by which chamber $b$ is gradually filled from the bottom toward the top, and as the temperature of the water is gradually raised by contact with the inside cream-containing box, $a$, the heated water is drawn off through pipe $d$, the faucet of which is left open for that purpose. If it is desired to empty the chamber $b$ of water, this is accomplished by opening the faucets at the upper ends of both pipes $d$ and $e$, and also the faucet $l$ at the lower end of pipe $e$, through which the water is drawn off. In order to cause all parts of the cream to come in contact with the walls of box $a$, the agitator $h\,o$ should be worked now and then, which will accomplish this object. When the cream has reached the proper stage of sourness by means of this treatment, it may be drawn off through a faucet suitably arranged in the bottom of the inside box, $a$.

Having thus described our invention, we claim and desire to secure by Letters Patent of the United States—

The herein-described apparatus for souring cream, the same consisting of the inside metallic box or case, *a*, outside casing, A, having the cover *g*, provided with agitator *h o* and thermometer *i*, pipe *d*, provided with a faucet at its upper end, and the funnel-opening *n*, the inner end of said pipe opening into the top part of chamber *b*, and pipe *e*, provided with a faucet at its upper end, and funnel-opening *n'*, and having the cross-head *m* at its lower end opening into the bottom of chamber *b*, and provided with the faucet *l*, the whole constructed and arranged to operate substantially in the manner and for the purpose shown and specified.

In testimony whereof we have hereto affixed our signatures in presence of two witnesses.

NIELS CHRESTIAN MADSEN.
HANS JOSEPH NIELSEN.

Witnesses:
FREDERIK HARALD SOPHUS WOLFF,
EMIL HANSEN.